May 10, 1955
C. MARESH ET AL
2,707,900
MOVABLE SAMPLE HOLDERS IN A SPECTROPHOTOMETER INTEGRATING SPHERE
Filed April 26, 1951
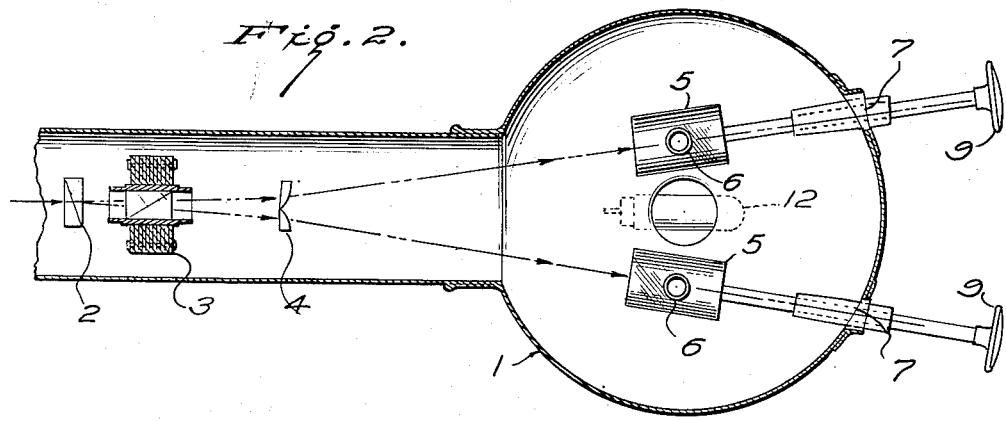
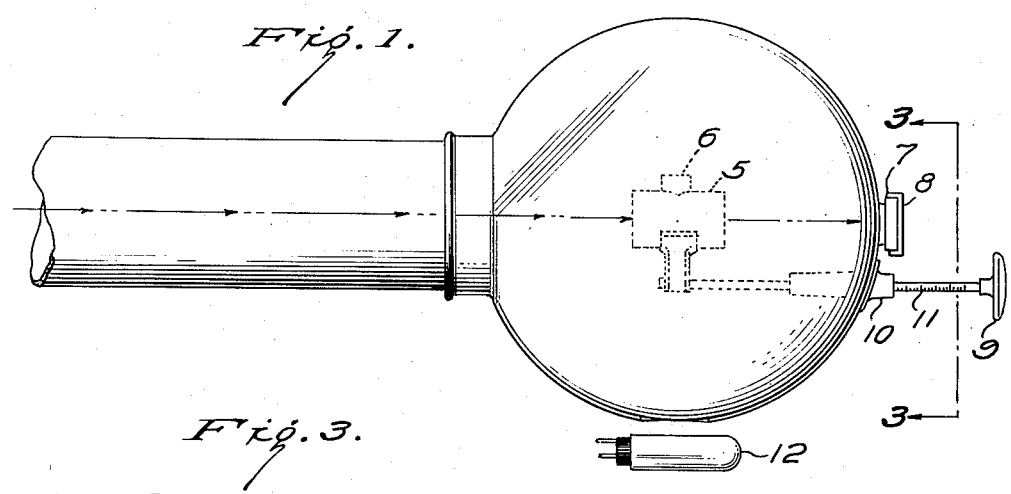
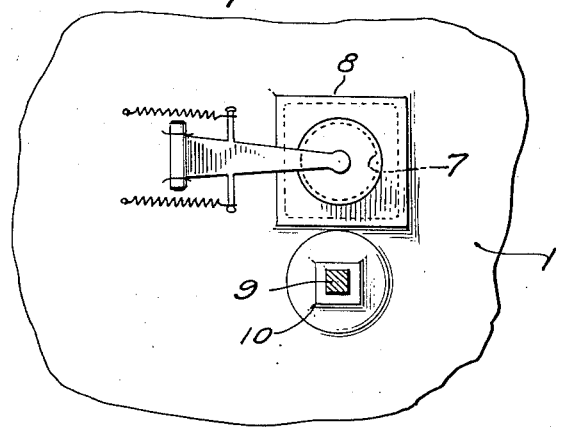
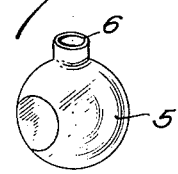
INVENTORS
CHARLES MARESH,
GEORGE L. BUC,
BY
Robert Thuer Morton
ATTORNEY __United States Patent Office__  
2,707,900  
Patented May 10, 1955

2,707,900

MOVABLE SAMPLE HOLDERS IN A SPECTROPHOTOMETER INTEGRATING SPHERE

Charles Maresh, Somerville, and George L. Buc, West Orange, N. J., assignors to American Cyanamid Company, New York, N. Y., a corporation of Maine Application April 26, 1951, Serial No. 223,023

5 Claims. (Cl. 88—14)

This invention relates to an improved integrating sphere for flickering beam spectrophotometers and attachments therefor.

The flickering type of spectrophotometer, and particularly those using polarized light as described in United States patent to Pineo, No. 2,107,836, have established themselves as the standards for rapid industrial spectrophotometry. In these instruments, monochromatic light from a monochromator passes through a photometering polarizing prism, then a Wollaston prism which splits the beam into two divergent beams plane-polarized at right angles to each other, followed by a rotating flickering device such as a rotating polarizing prism or rotating half wave plate and fixed polarizing prism which causes the two beams to flicker from a maximum to a minimum in opposite phase. One of the beams then passes through a transmission sample or is reflected from a reflectance sample and the other passes through or is reflected from a standard. The light from the two beams is then combined in an integrating sphere and the integrated light is fed into a photoelectric element such as a phototube in the input circuit of a high gain flicker frequency amplifier, the output of which rotates the polarizing prism in a direction to bring about balance in the light in the two beams. When the light is balanced, there is no light pulsation in the integrating sphere at flicker frequency and rotation of the polarizing element then stops. The amount of rotation required for balance is a measure of the absorption or reflectance characteristics of the sample at the particular wave length. Suitable variable ratio drives such as cams transform this rotation into movement of a recording device such as a recording pen moving across a drum, the latter being moved in accordance with wave length of the monochromatic light. A record is thus obtained of transmission or reflectance against wave length and these curves are in standard use in color work.

The integrating sphere of the spectrophotometer responds to light of any type and does not distinguish between different kinds of light beams. It is therefore impossible to measure scattering of light or direction changes. There is a need for an automatic recording device of the type of a flickering beam spectrophotometer for the measurement of various degrees of scattering of light. It is with the solution of this problem that the present invention deals.

The present invention makes use of the optics of an ordinary flickering beam spectrophotometer but modifies the construction of the integrating sphere. As in the ordinary spectrophotometer there are holders for transmission samples and standards. In line with them there are holders for special samples or cells to take materials, the light scattering properties of which are to be examined. The cells are positioned so that unscattered light passes out through open windows in the integrating sphere. As a result, unscattered light in each beam passes through the windows and is not reflected by the walls of the integrating sphere and so does not contribute to the integrated light from the two beams which impinges on the customary photocell. Since only the scattered light is integrated, the spectrophotometer registers the ratio between the amount of scattered light at each wave length from sample and standard, and a curve of relative scattering is thus drawn.

It is sometimes desirable to measure the ratio between scattered light and unscattered light from the same sample. In such a case, the standard cell may be placed in an elongated holder coated on the inside with light absorbing paint so that scattered light is absorbed and only unscattered light or light scattered at a very acute angle passes through. In such a case, the window in the integrating sphere is not open but a suitable reflecting block such as a standard white magnesium carbonate block is struck by the light. The same result can be obtained by having the standard cell outside of the integrating sphere positioned so that substantially only unscattered light enters the sphere.

The invention in its broader aspects includes devices which are capable of measuring scattered light only. However, it is often undesirable to have a single purpose instrument because a flickering beam spectrophotometer represents a large investment and the number of scattered light measurements is often less than those of ordinary total light. It is an advantage of a preferred modification of the present invention that the same instrument may be used to measure at will either scattered light or total light. This is effected by providing suitable reflectance block or sample holders which preferably can be swung into position covering the two windows by a simple movement of two elements. It is therefore possible to change almost instantly the preferred type of instrument from a scattered light spectrophotometer to a total light spectrophotometer. Because of the practical advantages of such a dual purpose instrument, it constitutes the preferred embodiment of the present invention but is not intended to limit the invention to the details thereof.

The invention will be illustrated in greater detail in conjunction with the drawings in which:

Fig. 1 is a side elevation of an integrating sphere embodying the present invention;

Fig. 2 is a horizontal section through Fig. 1;

Fig. 3 is a detailed section along line 3—3 of Fig. 1; and

Fig. 4 is a detail of one type of cell.

Since the present invention is concerned only with the integrating sphere of a spectrophotometer, most of the other elements of the spectrophotometer such as the monochromator, photometering drive, etc. are not shown, these being the same as in standard flickering beam spectrophotometers such as those described in the Pineo patent referred to above.

In Fig. 2 there is shown the integrating sphere 1 with a portion of the optics including the Wollaston prism 2 which splits the beam of polarized monochromatic light into two deviating beams plane-polarized at right angles to each other, the synchronous motor driven flicker prism 3, and decentering lenses 4. The two beams are shown as passing through cells 5 provided with filler opening 6. The light passing through the cells is partially scattered. The unscattered light passes out through the windows 7. These cells are carried on square adjustment rods 9 which pass through square guides 10 in the wall of the integrating sphere (Fig. 3).

The integrating sphere is provided with conventional phototube 12 projecting into the sphere. The latter is connected into the input circuit of the conventional high gain flicker frequency amplifier. As the modifications of the integrating sphere do not in any way affect the amplifier it is not shown.

When the photometering prism of the spectrophotometer is set to the point where each of the two flickering beams are of equal strength, the amount of light integrated in the sphere from each beam will depend on the scattering in the cells 5. If scattering is the same in both sample and reference, then there will be no pulsation of integrated light at flicker frequency. In other words, the machine will be balanced, and there will be no flicker-frequency signal on the phototube 12, no movement of the photometering element of the spectrophotometer will therefore take place. If, however, at any wave length there is more scattering in either the sample or the standard, integrated light will pulsate in phase with the stronger beam of scattered light, a flicker frequency signal will be imposed by the phototube 12 onto the input circuit of the amplifier and the photometering element will be driven in a direction to change the relative intensities of the beams until the machine again balances. If the spectrophotometer is of the recording type, the recording element will move in the conventional manner. For scattered light measurements, the windows 7 are open and the unscattered portion of each beam will pass out of the integrating sphere and its light will not be integrated. In other words, the machine will only record differences in the amount of scattered light in each beam, the unscattered component playing no part.

As the monochromator of the spectrophotometer moves through the spectrum and the recording drum is rotated in the conventional manner, a record is drawn of the amount of unbalance in scattered light at each wave length.

If it is desired to record either total light for a transmission sample or unscattered light, the windows 7 are closed by hinged covers 8 in which can be mounted suitable reflectance surfaces, for example, standard white magnesium carbonate blocks. The total light in each beam will be integrated and if transmission samples and standards are in the conventional holders (not shown), the instrument will behave as an ordinary transmission spectrophotometer. If reflectance measurements are desired, the transmission samples are removed and one reflectance sample is mounted in one cover 8 and a standard, either white or colored, in the other. The instrument will then operate in the conventional manner as a reflectance spectrophotometer. Frequently, it is desirable to measure the ratio of scattered light to total light. In this case, the sample is inserted only in one beam and the cover for the window of the other beam is closed carrying a standard white reflectance block. This constitutes a standard beam of both scattered and unscattered light. The photometering element will then be turned until the standard beam has been weakened and the sample beam strengthened to a point where the instrument balances. Operation through the spectrum will then give a curve showing the ratio of scattered light to total light throughout the spectrum.

When light passes through one of the cells 5, the scattered light is not all scattered at right angles. Some of it is only slightly scattered and may be thought of as a cone of scattered light leaving the end of the cell. If the cell end is directly against an open window, this cone of scattered light will leave the integrating sphere together with the unscattered light and only light scattered at a very wide angle will be integrated. On the other hand, the further the cell is moved from the window, the light scattered at smaller angles will strike the rear wall of the integrating sphere. The dimensions and shape of the cell will also affect the amount of light scattered at low angles which misses the window. The maximum amount of light going out through the window is obtained with a short cell, such, for example, as a short cylindrical or spherical cell directly in contact with the window. Two kinds of cells are shown, long cylindrical ones in Figs. 1 and 2 and short spherical ones in Fig. 4. Also, it is possible to move the cell holder away from the window by pushing in on the rods 9. Preferably, these carry a scale 11 so that cell positioning at predetermined points can be rapidly effected. It is thus possible to measure either all of the scattered light by moving the cell a long way from the window, or only light scattered at relatively large angles. The instrument is therefore very flexible and can be used for all types of light scattering measurements.

As the cells are easily interchanged, it is possible to use the instrument effectively over a very wide range of scattering. With materials of very low turbidity the amount of scattered light may be so small that the instrument's accuracy is adversely affected. In such a case, a much longer cell can be used in order to provide sufficient scattering for accurate measurement.

Most measurements of light scattering are with liquids, frequently carrying suspended solids. Sometimes the liquid is not colorless. Of course, color absorption will affect the reading of the instrument but this color effect can easily be neutralized by using the same liquid without suspended solids or another transparent liquid of the same color in one of the cells to be used as a standard.

Another use for the instrument is to measure semi-transparent mirrors or semi-transparent material exhibiting dichroic effects. In such cases the material is mounted on the cell holders. In the case of a semi-transparent mirror, the transmitted light can pass out the window and the amount of reflectance can be measured against a similar mirror with the window closed with a standard white block in the holder 8. Other types of measurements are also possible and it is not intended to limit the present invention to any particular type of material to be examined for its scattering properties.

We claim:

1. In a flickering beam spectrophotometer provided with an integrating sphere having two openings in the front wall thereof, means for introducing two divergent beams of light flickering from maximum to minimum in opposite phase into the sphere through said openings, windows in the opposite wall of the integrating sphere positioned to be struck by the two beams, the improvement which comprises elements passing through the sphere wall and movable parallel to each beam respectively, but being displaced from the axes of said beams, and cell holding means carried by said movable elements positioned to carry cells in said beams.

2. A device according to claim 1 in which there is provided reflectance sample holders for each window and means connected to the holders and the integrating sphere for moving the holders into and out of registry with their respective windows.

3. A device according to claim 2 in which the reflectance sample holders are hinged to the integrating sphere wall.

4. A device according to claim 3 in which the elements movable parallel to the beams are rods of polygonal cross-section passing through supports on the integrating sphere wall having openings of the same cross-sectional shape.

5. A device according to claim 1 in which the elements movable parallel to the beams are rods of polygonal cross-section passing through supports on the integrating sphere wall having openings of the same cross-sectional shape.

References Cited in the file of this patent

UNITED STATES PATENTS

| Number | Name | Date |
| --- | --- | --- |
| 1,831,766 | Hanks | Nov. 10, 1931 |
| 1,834,905 | Sheldon | Dec. 1, 1931 |
| 1,882,919 | Robbins | Oct. 18, 1932 |
| 2,383,346 | Shurcliff | Aug. 21, 1945 |